United States Patent [19]
Mashiko et al.

[11] Patent Number: 5,824,758
[45] Date of Patent: Oct. 20, 1998

[54] COPOLYMER OF CHLOROPRENE AND α-CYANOACRYLATE

[75] Inventors: Yoshihiro Mashiko; Masao Koga; Shiro Matsunaga, all of Niigata, Japan

[73] Assignee: Denki Kagaku Kogyo Kabushiki Kaisha, Tokyo, Japan

[21] Appl. No.: 646,148

[22] Filed: May 7, 1996

[30] Foreign Application Priority Data

May 9, 1995 [JP] Japan .................................. 7-110795

[51] Int. Cl.⁶ ................................................ C07F 236/18
[52] U.S. Cl. .......................................... 526/295; 526/294
[58] Field of Search .................................. 526/295, 294, 526/297

[56] References Cited

U.S. PATENT DOCUMENTS

| | | | |
|---|---|---|---|
| 2,379,297 | 6/1945 | Harmon et al. | |
| 5,089,576 | 2/1992 | Tsuji | 526/297 |
| 5,512,647 | 4/1996 | Ozoe | 526/297 |

FOREIGN PATENT DOCUMENTS 1116933  6/1968  United Kingdom .

OTHER PUBLICATIONS

Database WPI, Derwent Publications, AN–85–024741, SU–A–1–100281, Jun. 30, 1984.

*Primary Examiner*—Christopher Henderson
*Attorney, Agent, or Firm*—Oblon, Spivak, McClelland, Maier & Neustadt, P.C.

[57] ABSTRACT

A copolymer comprising monomer units of the following chemical formulas (1) and (2), wherein the total number of these monomer units is from 10 to 5,000:

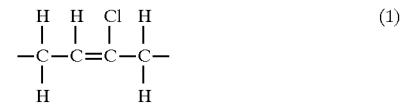

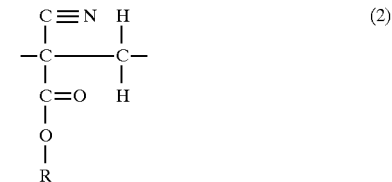

wherein R in the formula (2) is a $C_{1-16}$ alkyl group, a $C_{2-16}$ alkoxyalkyl group, a haloalkyl group, a cyanoalkyl group, an allylalkyl group, a cyclohexyl group, or a phenyl group.

8 Claims, 5 Drawing Sheets

COPOLYMER OF CHLOROPRENE AND α-CYANOACRYLATE

BACKGROUND OF THE INVENTION

1. Field of the Invention

The present invention relates to a copolymer containing chloroprene monomer units and α-cyanoacrylate monomer units. More particularly, it relates to a novel copolymer comprising chloroprene monomer units and α-cyanoacrylate monomer units, which is excellent in oil resistance, chemical resistance, weather resistance, adhesive properties, anti-crystallizability, etc.

2. Description of the Background

Chloroprene polymers are used in a wide range of fields including fields of automobile parts, adhesives and various industrial parts, by virtue of their balanced properties. Whereas, α-cyanoacrylate monomers are used for bonding various rubbers, plastics, metals, fibers, leathers, etc., as one-packed type instantaneous adhesives, by virtue of their characteristics such that they will quickly polymerize by an influence of a very small amount of moisture present on the surface of the object to be bonded.

On the other hand, various attempts have been made to further improve the properties of the chloroprene polymers. One of them is a method of copolymerizing a comonomer component, and various chloroprene copolymers have been proposed. Known as such comonomers are, for example, sulfur, 2,3-dichloro-1,3-butadiene, 1-chloro-1,3-butadiene, styrene, acrylonitrile, methacrylonitrile, isoprene, butadiene, methacrylic acid and esters thereof (Rubber Chemistry and Technology, 49, 670 (1976), etc.). Further, a method is also known to improve the properties of rubber by grafting a comonomer to chloroprene rubber (e.g. Japanese Examined Patent Publications No. 84445/1961 and No. 6067/1968, and Japanese Unexamined Patent Publication No. 106913/1987).

However, even with chloroprene copolymers produced by the above-mentioned various methods, there are many cases in which modification of the properties have not yet been sufficient depending upon the particular applications. Further, chloroprene monomer has a very high polymerization rate as compared with other monomers, and the types of copolymerizable monomers have been practically limited. Further, among copolymerizable monomers, those other than sulfur, 2,3-dichloro-1,3-butadiene and 1-chloro-1,3-butadiene, have low copolymerizability as compared with chloroprene monomer and accordingly tend to be hardly taken into the polymer molecule. Thus, there has been naturally a limit in the improvement of the properties.

SUMMARY OF THE INVENTION

The present inventors have conducted an extensive research for a method of improving the properties of chloroprene polymers to overcome such a situation and as a result, they have been successful in the synthesis of a novel copolymer of a chloroprene monomer with an α-cyanoacrylate monomer and a copolymer of a chloroprene monomer, an α-cyanoacrylate monomer and 1-chloro-1,3-butadiene and/or 2,3-dichloro-butadiene under such a condition that the moisture in the system is sufficiently removed during the polymerization and have thus arrived at the present invention.

That is, the present invention provides a copolymer comprising monomer units of the following chemical formulas (1) and (2), wherein the total number of these monomer units is from 10 to 5,000:

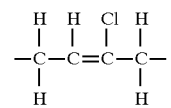

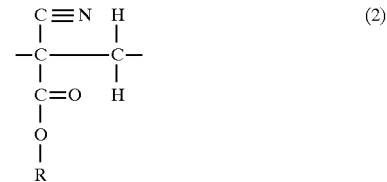

wherein R in the formula (2) is a $C_{1-16}$ alkyl group, a $C_{2-16}$ alkoxyalkyl group, a haloalkyl group, a cyanoalkyl group, an allylalkyl group, a cyclohexyl group, or a phenyl group.

Further, the present invention provides a copolymer comprising monomer units of the above chemical formulas (1) and (2) and, 1-chloro-1,3-butadiene monomer units and/or 2,3-dichloro-1,3-butadiene monomer units, wherein the total number of these monomer units (hereinafter referred to simply as a polymerization degree) is from 10 to 5,000.

DETAILED DESCRIPTION OF THE INVENTION

Figure 1:
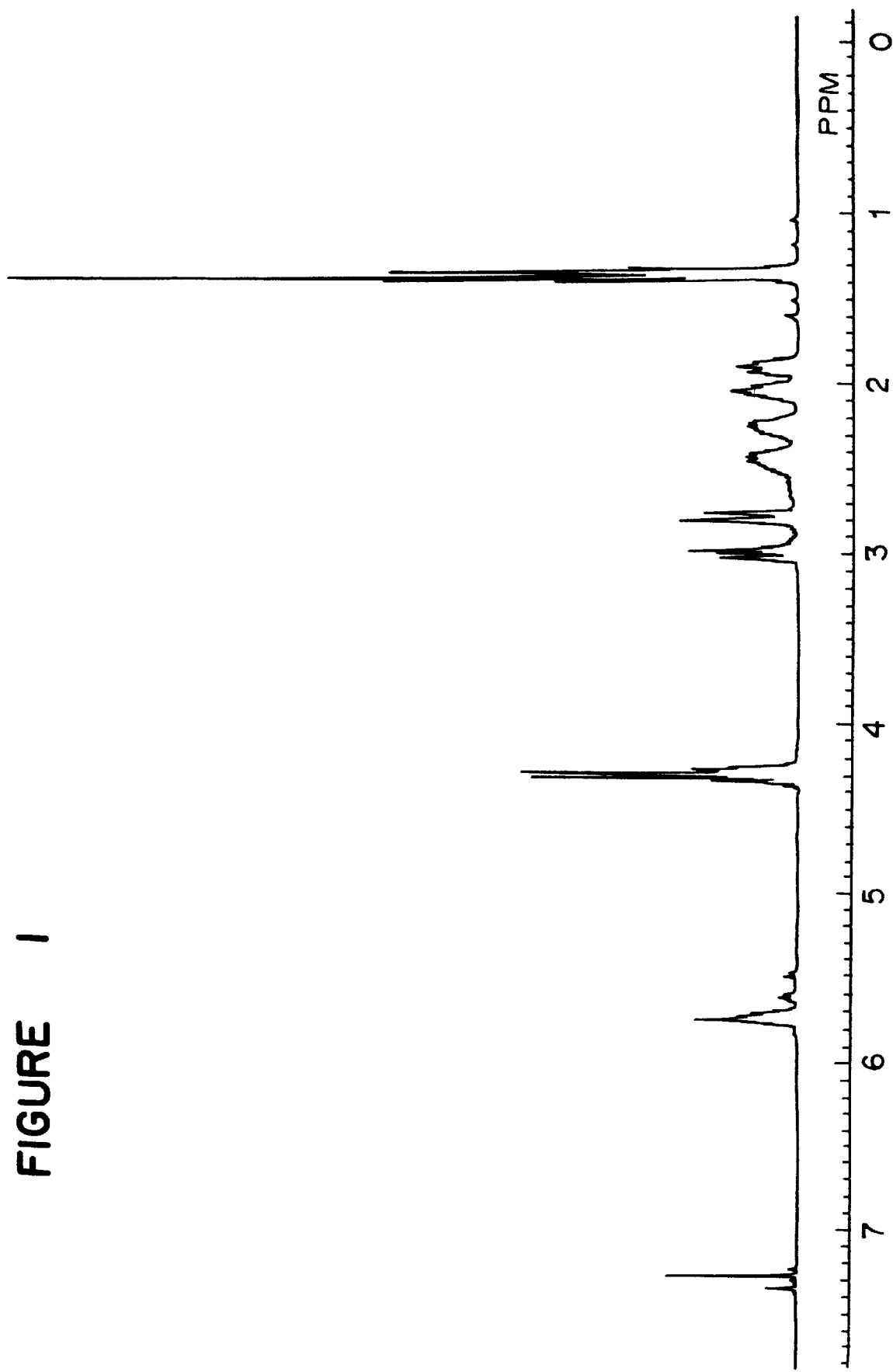
FIG. 1 shows the $^1$H NMR spectrum at 400 MHz of the copolymer obtained in Example 1.

Now, the present invention will be described in detail with reference to the preferred embodiments.

In the present invention, chloroprene monomer is used alone or in combination as a mixture with 1-chloro-1,3-butadiene monomer or other monomer copolymerizable therewith (hereinafter sometimes referred to as a chloroprene-containing monomer). The monomer copolymerizable with chloroprene includes, for example, the above-mentioned sulfur, 2,3-dichloro-1,3-butadiene, styrene, acrylonitrile, methacrylonitrile, isoprene, butadiene, methacrylic acid and esters thereof. Such a copolymerizable monomer is used in such an amount not to impair the properties of chloroprene. The α-cyanoacrylate monomer to be used in the present invention is the one represented by the following formula (3):

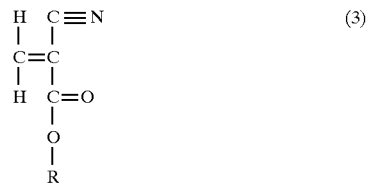

wherein R is a $C_{1-16}$ alkyl group, a $C_{2-16}$ alkoxyalkyl group, a haloalkyl group, a cyanoalkyl group, an allylalkyl group, a cyclohexyl group or a phenyl group.

In the above formula (3), R is preferably a methyl group and an ethyl group from the viewpoint of e.g. economy. Such α-cyanoacrylate monomers may be used alone or in combination as a mixture of two or more of them. Among the α-cyanoacrylate monomers, there are some which contain at least one polymerization inhibitor, such as an aromatic sulfonic acid or hydroquinone to prevent their reaction. However, by increasing or adjusting the amount of a polymerization initiator added, which will be described hereinafter, the reaction with the chloroprene-containing monomer can be initiated, and the inclusion of the polymerization inhibitor will be no trouble for the present invention.

In the preparation of the copolymer of the present invention, the polymerization operation and the polymerization method are important. The α-cyanoacrylate monomers are highly reactive with moisture and will form polymers if a very small amount of moisture is present under a suitable temperature condition. Further, the polymerization behavior of the chloroprene-containing monomer also changes by the presence of a very small amount of moisture. Accordingly, the polymerization is carried out in an atmosphere free from moisture by removing moisture in the polymerization reactor and the piping connected to the reactor and conducting a moisture-inhibited operation (injection by an inert gas) at the time of charging monomers to the polymerization reactor. Further, by adopting, as the polymerization method, homogeneous polymerization wherein the water-inhibited condition in the system can be maintained during the polymerization, i.e. solution polymerization or bulk polymerization employing a non-aqueous solvent, the present invention can be accomplished. Solution polymerization is especially preferred from the viewpoint of the temperature control and heat removal during the polymerization. As the solvent, toluene, benzene, xylene, acetone, tetrahydrofuran, dimethylsulfoxide or dimethylformamide may, for example, be employed by distilling it immediately before its use or by subjecting it to a dehydration operation beforehand by means of a dehydrating agent such as molecular sieve. The moisture content in the solvent is usually at most 20 ppm, preferably at most 5 ppm.

The polymerization temperature is usually within a range of from −20° to 55° C., preferably from 0° to 45° C., taking into consideration the controllability of the reaction of the chloroprene-containing monomer with the α-cyanoacrylate monomer and the boiling point of the chloroprene monomer.

The polymerization initiator is not particularly limited so long as it is a compound which is capable of generating free radicals at the polymerization temperature. For example, an azo compound such as azobis(4-methoxy-2,4-dimethylvaleronitrile) or azobis(2,4-dimethylvaleronitrile), or an organic peroxide such as di-n-propyl peroxydicarbonate or lauroyl peroxide, may be mentioned.

From the practical viewpoint, polymerization is preferably carried out at a conversion of at least 50%. When a predetermined conversion is reached, the reaction solution is cooled, and a small amount of a polymerization inhibitor is added to terminate the polymerization. The polymerization inhibitor may, for example, be a well known radical polymerization inhibitor such as thiodiphenylamine or 4-tert-butylcatechol. After termination of the reaction, an operation for adjusting the concentration such as removal of the solvent or addition of a solvent, may be conducted as the case requires. Further, it is also possible to incorporate a thickener or a plasticizer to such an extent not to impair the excellent characteristics of the present invention.

The chloroprene monomer and the α-cyanoacrylate monomer will preferentially form a copolymer substantially in an equimolar ratio so long as they are coexistent in the polymerization system. Accordingly, the feeding proportions of the two for polymerization may be optional, and if the feeding ratio departs from the equimolar ratio, a mixture of the copolymer of the chloroprene monomer with the α-cyanoacrylate monomer and other homopolymer and/or copolymer, will be obtained.

With a view to improving the properties of the chloroprene polymer, the feeding proportion of the chloroprene-containing monomer for polymerization is preferably at least 20 mol%. The proportion of the chloroprene monomer in the chloroprene-containing monomer is preferably at least 50 mol %, particularly at least 70 mol %.

The polymerization degree of the copolymer of the present invention is preferably from 10 to 5,000, more preferably from 100 to 3,000, most preferably from 300 to 2,000. Now, the method for producing the copolymer of the present invention will be described in detail with reference to Examples. However, it should be understood that the present invention is by no means restricted to such specific Examples.

EXAMPLES 1 to 3

Using a sufficiently dried pressure resistant glass polymerization reactor having an internal capacity of 1 l and equipped with a SUS piping and valve, vacuuming and introduction of dry nitrogen gas were repeated to remove moisture in the system, and then the reactor was maintained in a vacuumed state (gauge pressure: at most 5 mmHg). Then, in a separately prepared glove compartment of a nitrogen gas atmosphere, the monomers and reagent for the polymerization formulation as identified in Table 1 were introduced into a SUS pressure container having upper and lower two valves and having an internal capacity of 500 cc, and the valves were closed to shield the container from the external atmosphere. Then, the glove compartment was opened, and the SUS container was taken out and connected to the above-mentioned pressure resistance glass polymerization reactor. To remove the moisture at the connected portion, vacuum deaeration was carried out again.

Then, on one side of the SUS container, a pressure of 5 $kg/cm^2$ was exerted by dry nitrogen gas, and the monomers and toluene dehydrated to a moisture content of less than 5 ppm (hereinafter referred to as a feed liquid) were charged in their entire amounts into the polymerization reactor by valve operation. The moisture content was measured by a Karl Fischer moisture analyzer. The nitrogen gas pressure in the polymerization reactor was adjusted to a level of from 1 to 1.5 $kg/cm^2$. The feed liquid was stirred, and the temperature was adjusted. Then, as an initiator, 20 cc of a solution of azobis(2,4-dimethylvaleronitrile) dissolved in toluene in a concentration of 10 wt %, was intermittently injected by nitrogen gas from a separate pipe attached to the polymerization reactor and dropped to initiate the polymerization reaction. The remaining amounts of the monomers in the reaction solution were constantly analyzed by gas chromatography, and the monomer conversion during the polymerization was traced. When the conversion reached a predetermined level, the reaction solution was cooled, and as a polymerization inhibitor, a toluene solution of thiodiphenylamine was added in an amount of 50 ppm relative to the total amount of the charged monomers, to terminate the reaction and to obtain a copolymer.

Figure 2:
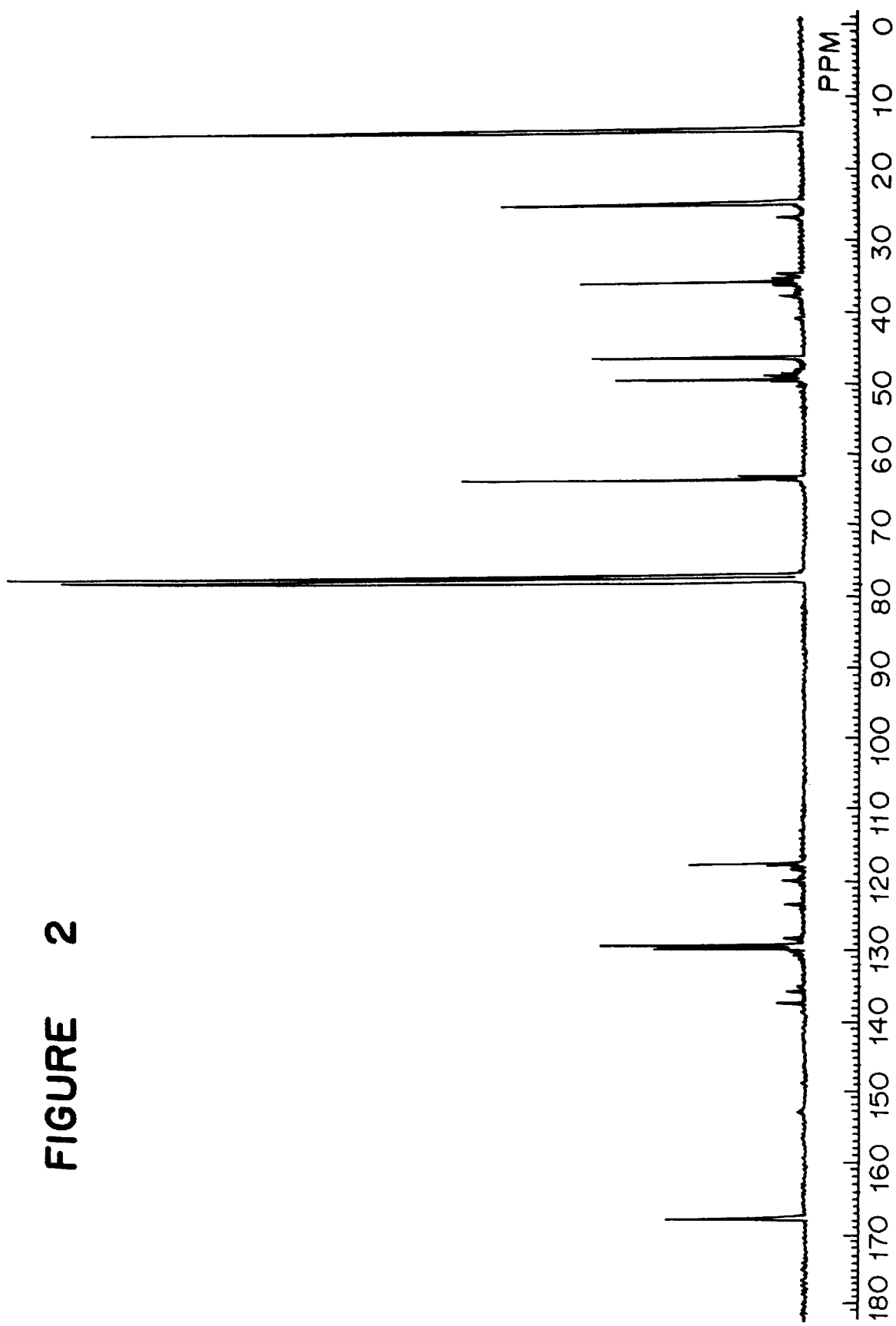
FIG. 2 shows the $^{13}$C NMR spectrum at 400 MHz of the copolymer obtained in Example 1.
Figure 3:
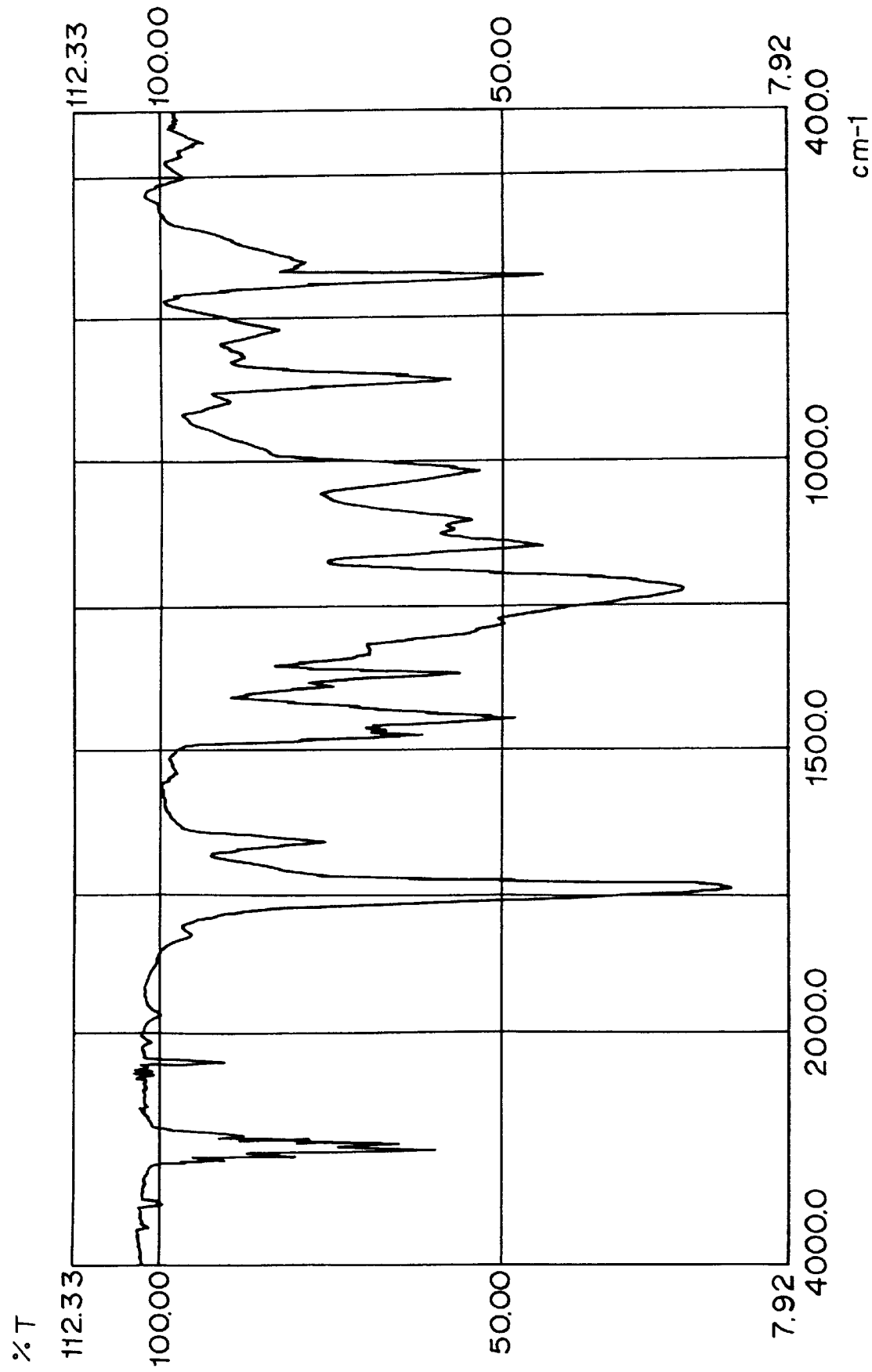
FIG. 3 is the Fourier infrared absorption spectrum of the copolymer obtained in Example 1.

The polymerization degree of each copolymer was calculated from the molecular weight obtained from gel permeation chromatography. Further, each copolymer was purified by means of benzene and methanol. A part of the purified copolymer was dissolved in heavy chloroform, and the molecular structure and the bonding state were identified by the $^1$H NMR spectrum and the $^{13}$C NMR spectrum, respectively. On the other hand, a part of the purified copolymer was coated on a KRS plate and dried, whereupon the Fourier transform infrared absorption spectrum of the copolymer was measured. The results are shown in FIGS. 1 to 3.

The glass transition temperature of each copolymer was measured by using a differential scanning calorimeter DSC-200, manufactured by Seiko Denshi K. K. and selecting the following temperature program in a nitrogen atmosphere.

Step 1: The copolymer was heated from room temperature to 120° C. at a constant heating rate of 10° C./min and then maintained at 120° C. for one minute.

Step 2: It was cooled from 120° C. to −100° C. at a constant cooling rate of 5° C./min, and then maintained at −100° C. for 2 minutes.

Step 3: It was heated from −100° C. to 200° C. at a constant heating rate of 10° C./min.

The glass transition temperature was measured in the above step 3. The results are shown in Table 1.

Further, a 20 wt % toluene solution of each copolymer was coated on a glass surface and dried to form a thin film of the copolymer, whereupon it was exposed outdoors for 14 days, and the color change before and after the exposure was visually observed. For the purpose of comparison, chloroprene rubber (A-90, manufactured by Denki Kagaku Kogyo K. K.) formed into a thin film in the same manner, was also observed in the same manner. While chloroprene rubber underwent yellowing, the copolymers obtained by the present invention underwent no color change and were excellent in the weather resistance. These results are shown in Table 1.

EXAMPLE 4

Figure 4:
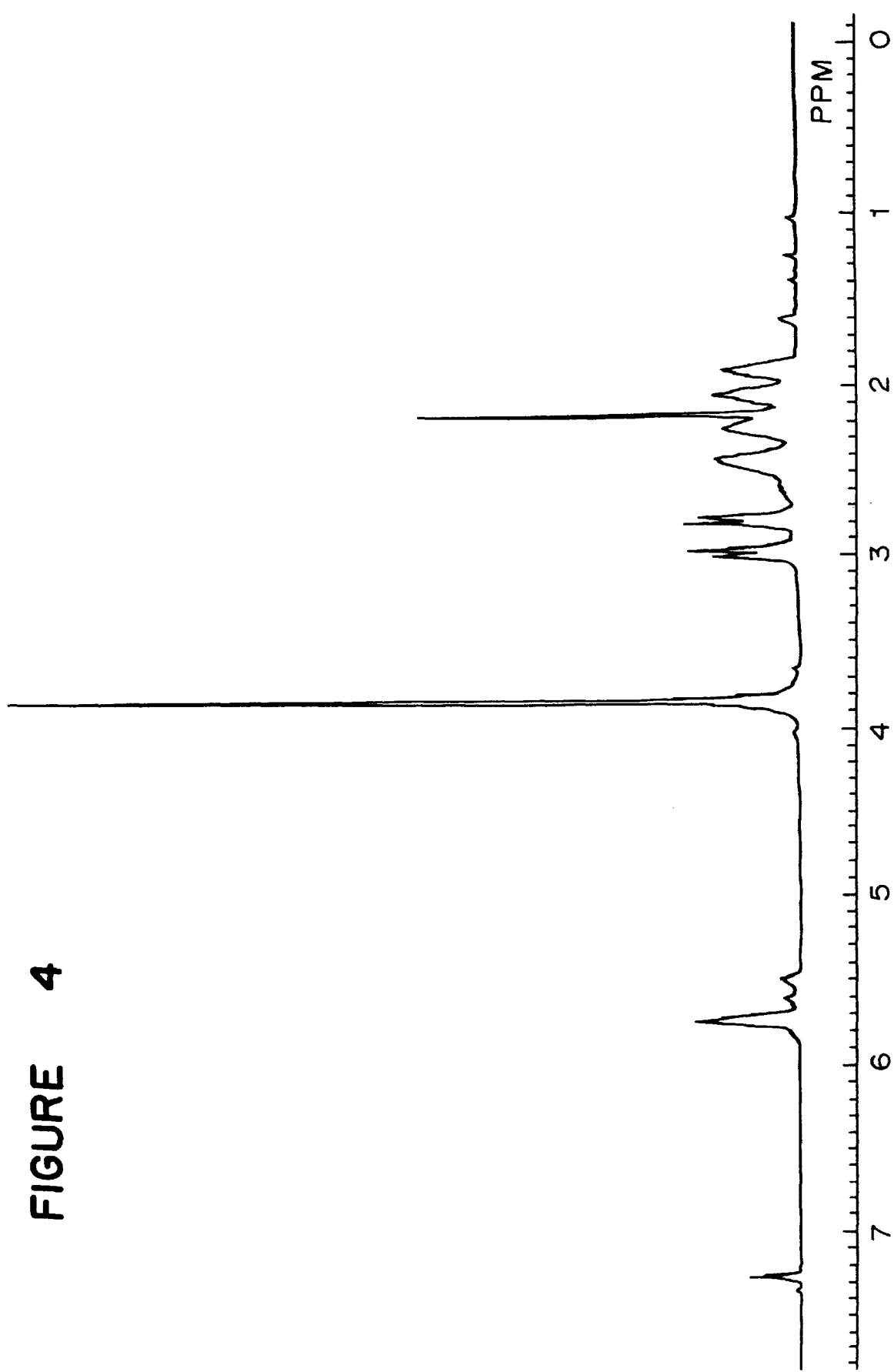
FIG. 4 is the $^1$H NMR spectrum at 400 MHz of the copolymer obtained in Example 4.
Figure 5:
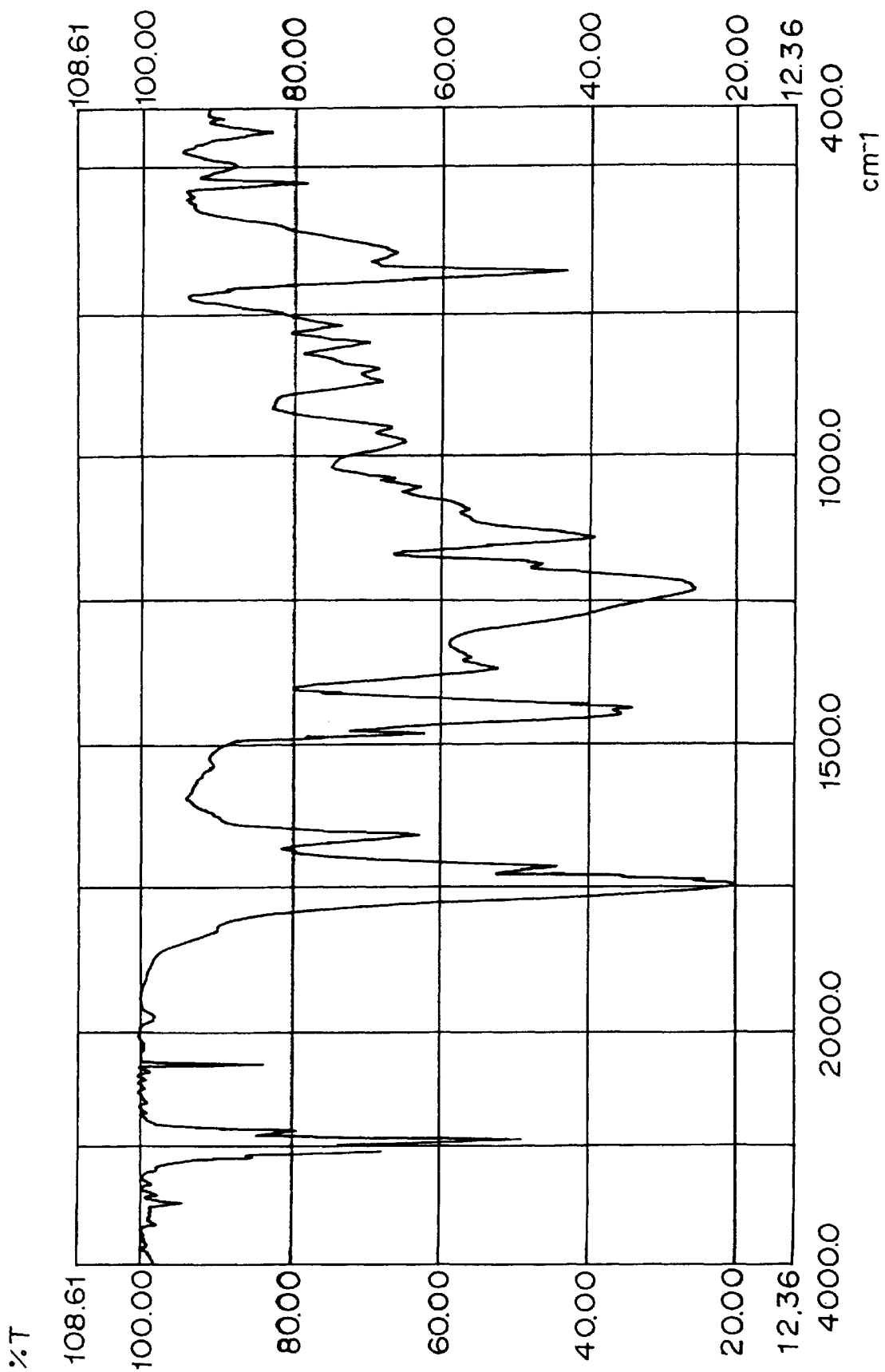
FIG. 5 is the Fourier infrared absorption spectrum of the copolymer obtained in Example 4.

Polymerization was carried out by using the same apparatus and procedure as in Example 1 except that α-cyanomethyl acrylate was used as the α-cyanoacrylate monomer. During the polymerization, a copolymer insoluble in toluene formed. A part of the precipitated copolymer was purified by means of acetone and methanol, and the molecular structure thereof was identified by the NMR spectrum and the infrared absorption spectrum. The results are shown in FIGS. 4 and 5. Further, other evaluation results are shown in Table 1.

EXAMPLE 5

Polymerization was carried out by using the same apparatus and procedure as in Example 1 and using 1-chloro-1,3-butadiene as a third component. The evaluation results are shown in Table 1.

TABLE 1

|  | Ex. 1 | Ex. 2 | Ex. 3 | Ex. 4 | Ex. 5 |
| --- | --- | --- | --- | --- | --- |
| Polymerization formulation (g) | | | | | |
| Chloroprene | 42 | 85 | 39 | 50 | 47.5 |
| 2,3-Dichloro-1,3-butadiene | — | — | 3 | — | — |
| 1-Chloro-1,3-butadiene | — | — | — | — | 2.5 |
| Ethyl α-cyanoacrylate | 58 | 15 | 58 | — | 50 |
| Methyl α-cyanoacrylate | — | — | — | 50 | — |
| Toluene (solvent) | 300 | 300 | 300 | 300 | 300 |
| Polymerization conditions | | | | | |
| Temp (°C.) | 45 | 45 | 30 | 45 | 45 |
| Time (hr) | 2.5 | 1 | 5 | 2 | 2.5 |
| Converisons (%) of monomers | | | | | |
| Chloroprene | 100 | 23 | 95 | 80 | 90 |
| 2,3-Dichloro-1,3-butadiene | — | — | 100 | — | — |
| 1-Chloro-1,3-butadiene | — | — | — | — | 80 |
| Ethyl α-cyanoacrylate | 100 | 100 | 100 | — | 100 |
| Methyl α-cyanoacrylate | — | — | — | 100 | — |
| Obtained amount (g) of copolymer | 88 | 31 | 84 | 76 | 82 |
| Polymerization degree | 560 | 420 | 470 | 400 | 580 |
| Glass transition temp (°C.) | 15.0 | 3.8 | 15.8 | 21.3 | 14.3 |
| Weather resistance 1) | No Change | No Change | No Change | No Change | No Change |

1) The color changes of the copolymer before and after the exposure in outdoors for 14 days.

In the above Examples, the chloroprene monomer, the 2,3-dichloro-1,3-butadiene monomer and the 1-chloro-1,3-butadiene monomer were monomers manufactured by Denki Kagaku Kogyo K. K. Further, the α-cyanoacrylate monomer was a monomer manufactured by Koatsu Gas Kogyo K. K.

The assignment relating to the main components of the copolymer obtained in Example 1 is shown below.

TABLE 2

| $^1$H NMR spectrum of FIG. 1 | |
| --- | --- |
| Chemical shift (ppm) | Assignment |
| 1.34 (T) | e |
| 1.89 (M) | f |
| 2.04 (M) | f |
| 2.25 (M) | a |
| 2.45 (M) | a |
| 2.77 (D) | c |
| 2.99 (D) | c |
| 4.28 (Q) | d |
| 5.74 (M) | b |

Reference CHCl$_3$: 7.26 ppm (CDCl$_3$ impurity peak)

In the above Table, D represents doublet, T triplet, Q quartet, and M multiplet other than D to Q. Further, a to f represent H shown in the following chemical formula:

TABLE 3

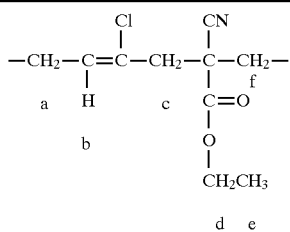

<u>$^{13}$C NMR spectrum of Figure 2</u>

| Chemical shift (ppm) | Assignment |
|---|---|
| 14.0 | ⑨ |
| 24.7 | ① |
| 35.7 | <u>10</u> |
| 46.0 | ④ |
| 49.3 | ⑥ |
| 63.3 | ⑧ |
| 117.5 | ⑤ |
| 129.0 | ② |
| 129.4 | ③ |
| 167.6 | ⑦ |

Reference CDCl$_3$: 77.0 ppm (center of three peaks attributable to CDCl$_3$ solvent)

①to 10 represent C shown in the following chemical formula:

TABLE 4

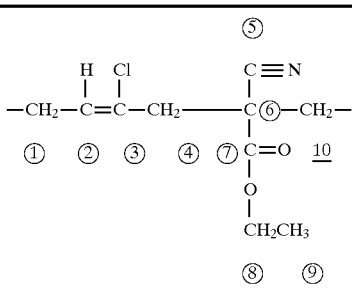

<u>Fourier infrared absorption spectrum of Figure 3</u>

| Absorption wavenumber (cm$^{-1}$) | Assignment |
|---|---|
| 2250 | Stretching vibration of CN (Attributable to ethyl α-cyanoacrylate) |
| 1740 | Stretching vibration of C=O of COOCH$_2$CH$_3$ (Attributable to ethyl α-cyanoacrylate) |
| 1660 | Stretching vibration of C=C (Attributable to chloroprene) |

TABLE 5

<u>$^1$H NMR spectrum of FIG. 4</u>

| Chemical shift (ppm) | Assignment |
|---|---|
| 1.90 (M) | e |
| 2.05 (M) | e |

TABLE 5-continued

<u>$^1$H NMR spectrum of FIG. 4</u>

| Chemical shift (ppm) | Assignment |
|---|---|
| 2.24 (M) | a |
| 2.42 (M) | a |
| 2.79 (D) | c |
| 2.99 (D) | c |
| 3.84 (S) | d |
| 5.74 (M) | b |

Reference CHCl$_3$: 7.26 ppm (CDCl$_3$ impurity peak)

In the above Table, S represents singlet, D doublet, and M multiplet other than D, and a to e represent H shown in the following chemical formula.

2.15 ppm is the peak attributable to the methyl group of acetone.

TABLE 6

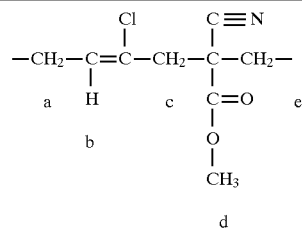

<u>Fourier infrared absorption spectrum of Figure 5</u>

| Absorption wavenumber (cm$^{-1}$) | Assignment |
|---|---|
| 2250 | Stretching vibration of CN (Attributable to methyl α-cyanoacrylate) |
| 1740 | Stretching vibration of C=O of COOCH$_3$ (Attributable to methyl α-cyanoacrylate) |
| 1660 | Stretching vibration of C=C (Attributable to chloroprene) |

The chloroprene copolymer according to the present invention is a copolymer expected to have excellent properties such as oil resistance, chemical resistance, weather resistance, adhesive properties and anti-crystallizability, from the molecular structure. Accordingly, it is expected to be practically or industrially useful as a modifier for chloroprene rubber or by itself as a copolymer.

We claim:

1. A copolymer comprising monomer units of the following chemical formulas (1) and (2), wherein the total number of these monomer units is from 10 to 5,000:

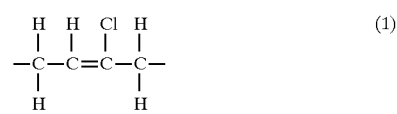

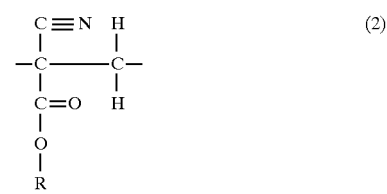

wherein R in the formula (2) is a C$_{1-16}$ alkyl group, a C$_{2-16}$ alkoxyalkyl group, a cyclohexyl group, or a phenyl group.

2. The copolymer according to claim 1, wherein R is a methyl group and/or an ethyl group.

3. The copolymer according to claim 1, which contains 1-chloro-1,3-butadiene monomer units as a third component.

4. The copolymer according to claim 1, which contains 2,3-dichloro-1,3-butadiene monomer units as a third component.

5. The copolymer of claim 1, wherein said monomer units are chloroprene and ethyl-α-cyanoacrylate.

6. The copolymer according to claim 1, which contains as a third component, monomer units selected from the group consisting of sulfur, 2,3-dichloro-1,3-butadiene, styrene, acrylonitrile, methacrylonitrile, isoprene, butadiene, methacrylic acid, and esters of methacrylic acid.

7. The copolymer according to claim 1, wherein the total number of monomer units of chemical formulas (1) and (2) is from 100 to 3000.

8. The copolymer according to claim 7, wherein the total number is from 300 to 2000.

* * * * *